United States Patent [19]

Pedersen

[11] Patent Number: 5,891,481
[45] Date of Patent: Apr. 6, 1999

[54] TUBULAR CALIBRATION UNIT FOR MACHINES FOR EXTRUDING PLASTIC STRINGS SUCH AS PIPES

[76] Inventor: Knud Kristian Pedersen, Svejstrupvej 35, Svejstrup, Skanderborg, Denmark, DK-8660

[21] Appl. No.: 952,079

[22] PCT Filed: May 17, 1996

[86] PCT No.: PCT/DK96/00220

§ 371 Date: Nov. 17, 1997

§ 102(e) Date: Nov. 17, 1997

[87] PCT Pub. No.: WO96/36475

PCT Pub. Date: Nov. 21, 1996

[30] Foreign Application Priority Data

May 17, 1995 [DK] Denmark ................................ 0559/95

[51] Int. Cl.$^6$ .................................................. B29C 47/90
[52] U.S. Cl. ........................ 425/71; 264/209.4; 425/325; 425/392
[58] Field of Search .............................. 425/66, 71, 72.1, 425/325, 326.1, 387.1, 388, 392; 264/564, 566, 568, 209.4

[56] References Cited

U.S. PATENT DOCUMENTS

| | | | |
|---|---|---|---|
| 3,596,321 | 8/1971 | Upmeier | 425/71 |
| 4,408,970 | 10/1983 | Bustin et al. | 425/392 |
| 5,139,402 | 8/1992 | Topf | 425/71 |

FOREIGN PATENT DOCUMENTS

| | | |
|---|---|---|
| 0 670 212 | 9/1995 | European Pat. Off. . |
| 24 47 694 | 4/1976 | Germany . |
| 1 349 436 | 4/1974 | United Kingdom . |

*Primary Examiner*—Patrick Ryan
*Assistant Examiner*—Joseph Leyson
*Attorney, Agent, or Firm*—Sixbey, Friedman, Leedom & Ferguson; David S. Safran

[57] ABSTRACT

For calibration and stabilization of the discharge product from extruders it is known to use tubular calibration units both for calibration of the product diameter and for cooling of the product for initial stabilization of the product, whereby the calibration pipe should have a noticeable length. For a current exact calibration it may be desirable to effect small changes of the calibration diameter, yet with associated problem in exchanging the calibration pipe. The apparatus provides for a calibration pipe (14) with adjustable diameter, viz. in that the pipe is made of a number of split rings (16), which are juxtaposed with random locations of the splits (18), such that the pipe when seen in its axial direction is entirely unbroken. The rings (16) may be collectively radially compressed in a controlled manner by means of axially extending wedge clamp rods (24, 26) for a uniform adjustment of the diameter of the pipe (14) as a whole.

5 Claims, 1 Drawing Sheet

TUBULAR CALIBRATION UNIT FOR MACHINES FOR EXTRUDING PLASTIC STRINGS SUCH AS PIPES

BACKGROUND OF THE INVENTION

1. Field of the Invention

The present invention relates to a tubular calibration unit for calibrating the outer or inner diameter of extruded plastic string bodies such as pipes.

2. Description of Related Art

In the production of extruded plastic pipes it is customary that the hot plastic compound is forced through an extruder nozzle, the diameter of which is somewhat larger than the desired pipe diameter, the extrusion taking place to a calibration tube unit, at the inlet of which the plastic pipe is narrowed to the diameter of this unit, this diameter corresponding fully or almost to the desired pipe diameter. The metallic calibration tube is cooled by cold water such that during its throughflow the plastic compound solidifies sufficiently to be stabilized with a corresponding pipe diameter as it leaves the unit. Thereafter the pipe is passed through a cooling zone, normally of a length larger than that of the calibration tube, such that at the outlet from this zone the pipe is stabilized sufficiently for co-operation with a pulling station effecting the pull out of the pipe from its initial formation in the calibration tube. Thereafter the pipe can be passed further to be reeled or cut into desired lengths.

Normally, the production tolerances should be rather narrow, both for satisfying certain minimum requirements and for achieving this without overdosage of plastic.

In practice it happens that for several reasons changes in the process conditions may occur, such that for the desired optimizing of the produced pipe it may be required to use a slightly changed calibration diameter. In such cases it is necessary to stop the process and replace the calibration tube by another such tube with a diameter deviation of, maybe, only one or half a millimeter.

Such a change, therefore, implies a production stop and often scrapping of many meters of produced pipe, so it would be highly desirable if it was possible to use calibration tubes with adjustable diameter, such that required adjustments could be effected currently, during operation.

The problem has earlier been considered in connection with narrow calibration rings, confer GB-1,349,436, where it has been possible to use a split ring with such a pronounced screw shaped split that the ring, seen in the direction of throughflow, will be unbroken annular, whether it is squeezed to a more or less advaced closing of the oblique split. Also, from U.S. Pat. No. 4,578,025 is known a construction comprising a row of mutually widely separated calibration rings provided at the outer end portions of funnel shaped elements and being controllable to undergo a more or less pronounced, resilient expansion or contraction.

These solutions, however, are unusable when it is a condition that the calibration unit be a heat/cold transferring, regular tube, preferably having a length up to several times its diameter. This is confirmed by practice, where it has been necessary to effect the said problematic total change out of the calibration tubes.

SUMMARY OF THE INVENTION

With the present invention it has been recognised that in fact it is possible to realise a calibration tube with variable diameter, viz. in that this tube is made up of a row of closely juxtaposed, split ring members, the splits of which are generally located mutually staggered in the peripheral direction, such that the tube when seen in the throughflow direction has a fully closed tubular shape; extending along this tube, axially oriented elements are provided which are controllable to effect a collective radial impact on all of the ring members for changing the operative diameter thereof. It will not be required that the splits of the single ring members be oblique, when they are only peripherally offset from each other, and there will be no question of dealing with any total resiliency of entirely closed ring elements.

Thus, a calibration tube according to the invention may, as a unit, extend over a noticeable length in both calibrating and cooling engagement with the extruded pipe, and yet be diameter adjustable in an easy and rapid manner, though of course within certain limits.

The said axially extending elements for influencing all of the rings may, in order to achieve a good stability of the calibration tube, be made as sets of co-operating wedge clamp rods, of which one may engage the rings with a straight, unbroken edge, while the other may correspondingly engage a supporting structure by its opposite edge, e.g. a number of outer, rigid ring parts; when the plane of partition between the two rods is shaped as a row of sawteeth, then a mutual longitudinal displacement between the two rods will induce an increase or a reduction of the total thickness of the pair of rods, all in such a manner, known per se, that large pressure forces may be transferred between the opposite exterior sides all along the length of the rods. With the use of such sets of rod elements suitably spaced along the periphery of the calibration tube it is possible to achieve a ring deformation while maintaining a circular shape of the rings. All of the displaceable rod elements may in a simple manner be operated to carry out a uniform and concurrent displacement when they are all in axial engagement with an annular track in a union, which is in screw connection with a cylinder member of the rigid frame structure.

In the foregoing, what is primarily referred to is a calibration unit for the outer diameter of the extruded pipe, but the principles of the invention may equally well apply to tubular calibration cores for calibrating the internal diameter.

In the following the invention is described in more detail with reference to the drawing, in which:

BRIEF DESCRIPTION OF THE DRAWINGS

FIG. 1 is a perspective view of a preferred embodiment of a calibration unit according to the invention, for external calibration of an extruded plastic pipe, while

DETAILED DESCRIPTION OF THE INVENTION

Figure 1:
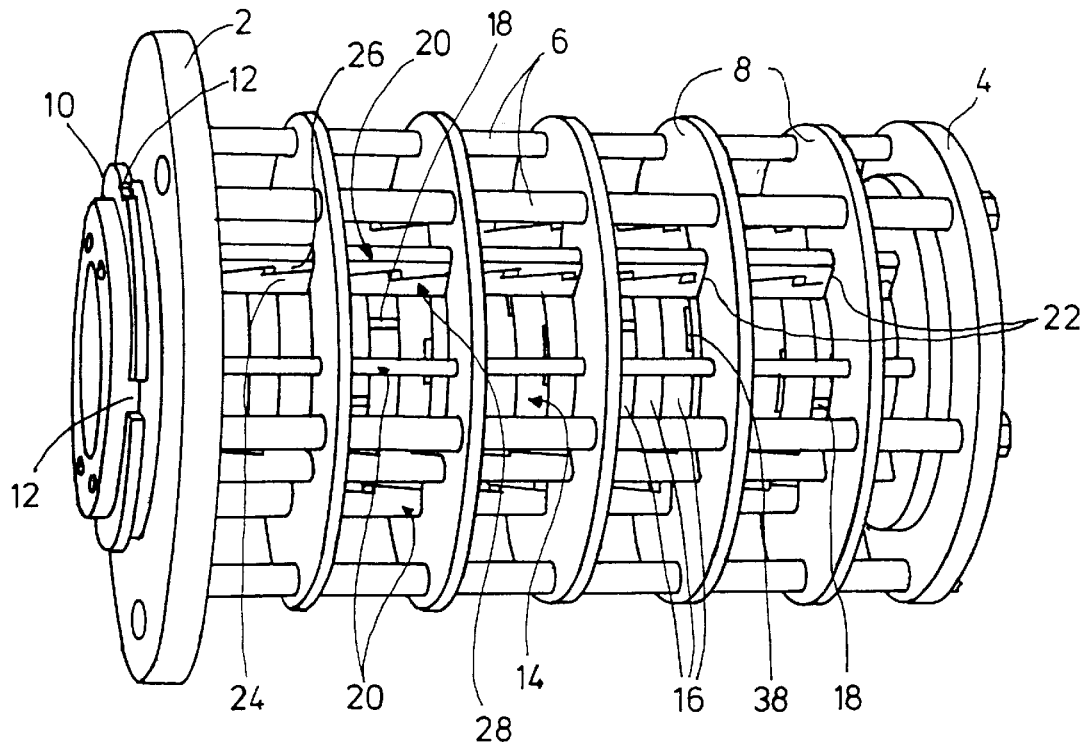

The calibrator shown in FIG. 1 has an outer, rigid framework comprising a foremost ring flange 2 and a rearmost ring flange 4 and, located therebetween, a number of peripherally mounted stay bolts 6, to which there is secured a number of plate rings 8, axially spaced by means of intermediate sleeves 7. The front ring flange 2 is internally threaded for screw engagement with a bushing 10 provided with externally accessible notches 12 for operating the screw bushing.

As a main part, the calibrator comprises an inner tubular core 14 made of a plurality of juxtaposed individual rings 16, which are each of a heat resistant and resilient material such as brass or bronze and each made with a split 18 enabling each of the rings to be compressed into a diameter smaller than their natural diameter.

The entire tube core 14 is held in place by means of a number of rod elements 20 supported in radial slots 22 in the plate rings 8. These rod elements are, each, made of an interior rod 24, which abuts uniformly the outsides of all the core rings 16 along a straight inner edge, and an exterior rod 26, the straight outer edge of which rigidly abuts the outer bottoms of the radial slots 22 in the ring plates 8. At their sides or edges facing each other both of the rods 24 and 26 are provided with complementary, longish toothings, generally designated 28, enabling the radial dimension of the two rods to be varied by a mutual axial displacement of the rods.

Figure 2:
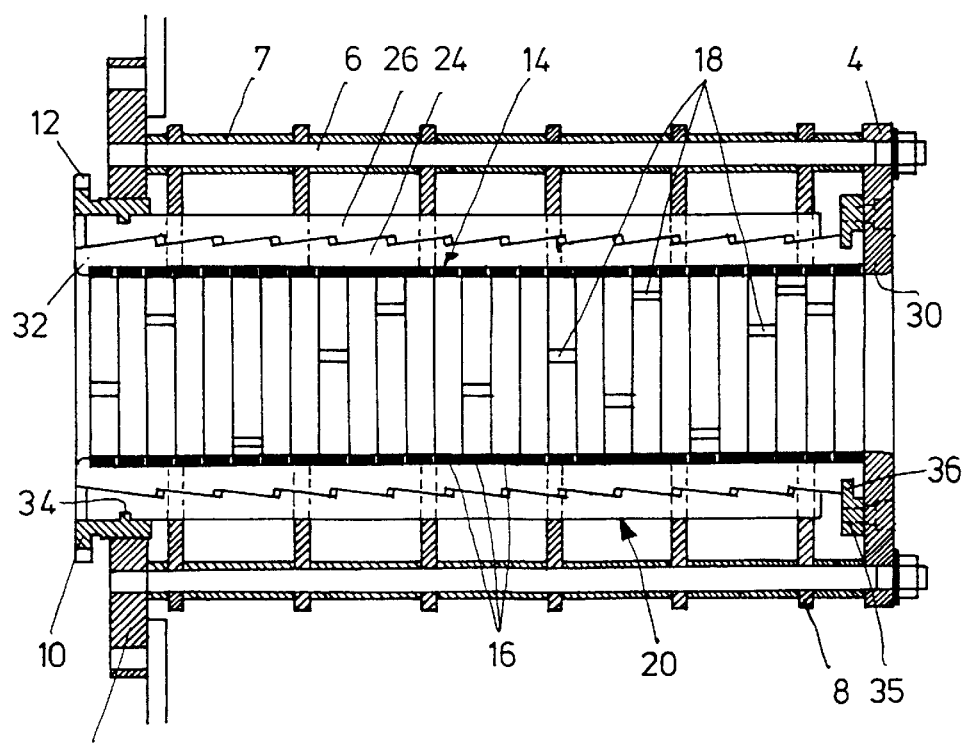
FIG. 2 is a longitudinal sectional view thereof.

As shown in more detail in FIG. 2, the core tube is at its outer end secured axially against an inner annular area 30 of the rear flange 4, while its front end is secured behind inwardly projecting end portions 32 of the inner rods 24, which are, themselves, at their opposite ends axially secured to the rear flange 4 by means of a holding ring 35 secured to this flange and having an inwardly projecting engagement flange portion 36.

At their front ends, the outer rods 26 are axially displaceably arranged, in being connected with the said threaded bushing 10, e.g. by a simple flange and notch connection 34 as shown.

On this background it will be understood that it is possible, by rotating the bushing 10, to provoke a longitudinal displacement of all the outer rods 26, whereby the toothings 28 thereof will slide inwardly or outwardly on the corresponding toothings of the inner rods 24, such that these will squeeze the rings 16 into a smaller or bigger diameter. The core tube 14 will remain held in a centred manner due to the rod elements 20 being mounted evenly distributed along the periphery of the core tube.

As shown in both FIG. 1 and FIG. 2, the single rings 16 of the core tube 14 are mounted such that their individual splits 18 are generally mutually peripherally staggered. Thereby the core tube will maintain a character of a fully closed flow-through core, the diameter of which may be adjusted as desired, in a stepless manner within certain natural limits.

As also shown in both FIG. 1 and in particular in FIG. 2, the rings 16 may be provided with peripheral edge recesses 38, which in a manner known per se will enable a direct contact between the extruded pipe and the applied cooling water.

I claim:

1. A tubular calibration unit for calibration of the outer or inner diameter of extruded pipes or rods, comprising a row of ring elements, each of said ring elements being split in a circumferential direction in a manner enabling expansion and contraction of the operative diameter thereof, and controllable adjustment means for collectively adjusting the operative diameter of all of the ring elements; wherein the ring elements are tightly juxtaposed with respect to each other in an axial direction, the splits of adjacent ring elements are circumferentially offset with respect to each other and the splits of the row of rings are staggered with respect to each other longitudinally along the row, so that the row of rings have a substantially closed tubular shape.

2. A calibration unit according to claim 1, wherein said controllable adjustment means are wedge clamp rod systems comprising a pair of laid-together rod elements having interfacing oblique teeth for enabling a change of the total thickness of the clamp rod systems by a mutual longitudinal displacement of the rod elements, said rod systems being mounted between the ring elements and a fixed support means located radially spaced therefrom on an associated carrier structure.

3. A calibration unit according to claim 2, characterized in that a first set of said clamp rod elements is axially anchored to the carrier structure at one end, while the other set is axially anchored to a holding member, which is in threaded connection with the carrier structure.

4. A calibration unit according to claim 2, characterized in that the clamp rod elements extend through radial notches in a number of rigid guiding plates mounted mutually spaced along the tube in rigid connection with the carrier structure.

5. A calibration unit according to claim 4, characterized in that the guiding plates are fixed to stay bolts extending between rigid end flanges of the carrier structure at the opposite ends of the unit.

* * * * *